United States Patent [19]

Thomassen et al.

[11] Patent Number: 4,671,945
[45] Date of Patent: Jun. 9, 1987

[54] METHOD FOR SEPARATION AND LEACHING OF THE VALUABLE METALS IN SULPHIDE MATERIALS

[76] Inventors: Thomas Thomassen, N-4780 Brekkesto; Carl O. Kostol, N-4620 Vagsbygd, both of Norway

[21] Appl. No.: 800,139

[22] PCT Filed: Mar. 8, 1985

[86] PCT No.: PCT/NO85/00014
§ 371 Date: Oct. 29, 1985
§ 102(e) Date: Oct. 29, 1985

[87] PCT Pub. No.: WO85/03952
PCT Pub. Date: Sep. 12, 1985

[30] Foreign Application Priority Data

Mar. 8, 1984 [NO] Norway ............................. 840879
Nov. 12, 1984 [NO] Norway ............................. 844505

[51] Int. Cl.$^4$ ............................................. C01G 3/00
[52] U.S. Cl. ......................................... 423/27; 423/34;
423/36; 423/38; 423/41; 423/42; 423/45;
423/46; 423/92; 423/94; 423/98; 423/101;
423/103; 423/106; 423/109; 423/140; 423/146;
423/147; 423/150; 75/2; 75/101 R; 75/108;
75/111; 75/115; 75/117; 75/118 R; 75/120;
75/121; 204/106; 204/107; 204/108

[58] Field of Search .................. 423/27, 34, 36, 38,
423/41, 42, 45, 46, 92, 94, 98, 101, 103, 106,
109, 140, 146, 147, 150; 75/2, 101 R, 108, 111,
115, 117, 118, 120, 121; 204/106, 107, 108

[56] References Cited

U.S. PATENT DOCUMENTS

| | | | |
|---|---|---|---|
| 4,094,754 | 6/1978 | Symens et al. | 423/34 |
| 4,097,271 | 6/1978 | Swinkels et al. | 423/34 |
| 4,323,541 | 4/1982 | Saarinen et al. | 423/150 |
| 4,337,128 | 6/1982 | Haakonsen et al. | 423/38 |
| 4,384,890 | 5/1983 | Clevenger et al. | 423/38 |
| 4,552,632 | 11/1985 | Andersen et al. | 423/38 |

Primary Examiner—John Doll
Assistant Examiner—Robert L. Stoll
Attorney, Agent, or Firm—Andrus, Sceales, Starke & Sawall

[57] ABSTRACT

This is a method for the complete leaching of the valuable metals in a metal sulphide material which contains copper, zinc, lead, silver and iron by the use of a solution which essentially contains cupric chloride/sulphates. After the valuable metals have been recovered, the solution is regenerated whereby ferrous chloride and cuprous chloride/sulphate is oxidized to a ferric hydroxide solid and a cupric chloride solution respectively. The regenerated solution is split into two part-solutions and returned to the process.

One part-solution goes to a metathesis stage where the fresh metal sulphide material is added in large excess with respect to the part-solutions's content of copper. The result is that only the valuable metals like zinc, lead and silver are leached while copper and iron remain in the residue.

The other part-solution goes to a leach stage where the residue from the metathesis stage is added. The ratio between the residue and the solution is about stoichiometric, while the characteristic feature of this stage is how the leach operation is performed. This results in a well leached residue and an almost completely reduced solution in just one leach stage.

The residue from this stage goes to a third leach stage where all remaining valuable metals are leached completely by the use of chlorine gas/oxygen gas coming from the zinc electrolysis stage. Iron is precipitated as a hydroxide.

The ratio between the part-solution which goes to the metathesis stage and the part-solution which goes to the leach stage is between 1:1 and 1:100.

12 Claims, 2 Drawing Figures

METHOD FOR SEPARATION AND LEACHING OF THE VALUABLE METALS IN SULPHIDE MATERIALS

SUMMARY OF THE INVENTION

This invention deals with a method for the separation of the valuable metals zinc, lead and silver from copper and iron in complex metal sulphides which contains one or more of these valuable metals. Normally this is about the impure chalcopyrite concentrates. Further this invention is about a complete leaching of the copper and at the same time an almost fully reduced cuprous chloride and ferrous chloride solution is produced, from which the copper is recovered by electrolysis. The iron is removed from the solution by oxidation using air in the presence of cuprous chloride applying well known methods.

The new in this invention lies in the first separation technique, (the separation of zinc, lead and silver from copper and iron), and the following leaching of copper in a simplified effective leach operation. This excludes such operations as solvent extraction (Elkem) for zinc, and the leach operation for copper needs only one stage for 100% leaching, compared to others which needs 2 stages (Elkem) or only leaches 50–60% (Duval).

The separation and leaching is done by the cupric chloride/sulphate solution which is made by the oxidation of the solution coming from the copper electrolysis stage. This cupricchloride/sulphate solution is separated into two parts-solution. One part, and normally the smallest one (1–2% of the main part) goes to a metathesis stage where the copper in solution is exchanged with the zinc, the lead and the silver in the fresh metal sulphide material which is added.

These reactions only proceed by deliberately controlling the total chloride concentration in the solution to normally about 250 g/l, by injection of water or dilute filtrates to the stage, from washing operations of filter presses etc.

Then the zinc, the lead and the silver is dissolved as the copper in the solution is precipitated as a sulphide. The sulphur which the copper needs to make sulphides comes from the sulphur liberated when zinc, lead and silver is dissolved. It is important that at all time having an excess of elemental suphur ($S^o$) present for an effective precipitation of CuS. This can easiest be done by recycling some residue from the copper leach stage, a residue containing 70–80% elemental sulphur. The metals zinc, lead and silver can be separated from the solution by a number of different methods. Here an ordinary hydroxide precipitation is chosen. The leaching of copper and some of the iron from the chalcopyrite is in great contrast to the metathesis. The solution used in the metathesis stage, containing some 250 g/l chorides cannot be used in the leaching. One has to increase this intentionally to some 350 g/l for a complete leaching and reduction of the solution. The leaching can, of course, take place at lower choride concentrations, but then you do not get a reduced solution (Duval).

Duval only manages 50–60% leaching in their main leach stage and does the rest of the leaching in oxidation autoclave.

Elkem uses about 400 g/l chlorides and get a very reduced leach solution of ferrous chloride with some cuprous chloride. They need two leach stages for a complete leaching and simultaneously producing an almost fully reduced leach solution. Elkems ferric-chloride solution cannot be used for the metathesis reactions. The inventors have found a new way of combining known chemistry and chemical reactions, by intentionally separating the strong cupric chloride/sulphate solution from the oxidation/iron precipitation stage (containing some 350 g/l chlorides) into two part-solutions. The other part, and normally the largest part goes to the leach stage. Here the chloride concentration is kept on about 350 g/l by regulating the evaporation of water in an amount equal to the volume of water in the wash water/thin filtrates added in the metathesis stage. Thus the reaction between the copper in the leach stage and the copper in the leach residue forming a copper sulphide is avoided, and an almost fully reduced solution is obtained.

Most of the known type of continous reactors (stirred vessels) are concerned with what in terms may be called "shortening". This is a well documented phenomenon which means that fresh solution (here cupric chloride/sulphate solution) and concentrate (here chalcopyrite) travels right through the leach stage without reacting due to a too effective mixing in the tanks.

Normal correction done to this "shortening" is the use of more leach stages.

The inventors have found a unique metod to solve this problem. The stirrer and the leach tank is designed such that the unreacted chalcopyrite sinks to the bottom of the leach tank while the leach residue floats on top. This is based on the differences in the spesific gravity for the chalcopyrite and the leach residue. The strong, oxydized cupric chloride solution is fed into the lower chalcopyrite bed. There it reacts with fresh minerals all the time before entering the upper bed. This results in no "shortening" of solution and no unreacted chalcopyrite. The solution discharged from the overflow on the top of the tank is almost fully reduced.

The chloride concentration in the leach solution is maintained on the desired level (about 350 g/l) by additions of non-jarosite forming materials, like $MgCl_2$. The concentration of magnesium will vary from 85 g/l in the metathesis stage (due to dilutions) to about 110 g/l in the leach solution. The process solution in the leach stage is also intentionally kept at about 100–150 g/l of sulphates, as it is expensive and complicated to remove the sulphates completely.

The residue from the copper leach stage can be deposited and sulphur recovered if it is economically viable.

However, the continued research has demonstrated that when treating very complex concentrates, where the zinc content is so large that zinc electrowinning should be used to recover the zinc, it is an advantage to treat the leach residue from the copper leach tank in the oxidation tank and at the same time use the chlorine gas produced by the zinc electrowinning (and from lead or other metals which produce chlorine gas by electrolysis) in the tank for a complete leaching of possible traces of metals that might be left in the residue. Such a chlorine leaching is very straight forward, and normally done at 500–600 mV (SCE). This creates the advantage that into this tank other residues and solutions from purification operations can be added if desired, when concerned with the total ion balance of the process for better economy. This last leach tank is therefore acting as a dump where all things are added, chlorine leached and out comes a cupric chloride/sulphate solution containing varying amount of ferric chloride dependent on the variation in the excess of anions in the process. The iron is precipitated as a hydroxide and reports together with the sulphur residue. This residue can easily be stored.

This last chlorine leaching tank is a great advantage, especially when treating very intricate mineralogical complex concentrates.

The process can, of course, also be used on pure concentrates, and therefore not limited to impure, complex concentrates.

It is within the scope of this envention to use purification systems of different kinds in combination or separately. This includes as an example for the non-copper metals, precipitation as hydroxides, solvent extraction and cementation. The choice of which residues or solutions are returned to the chlorine leach stage may also be done singularly or in combinations.

DESCRIPTION OF THE ILLUSTRATED EMBODIMENT

Figure 1:
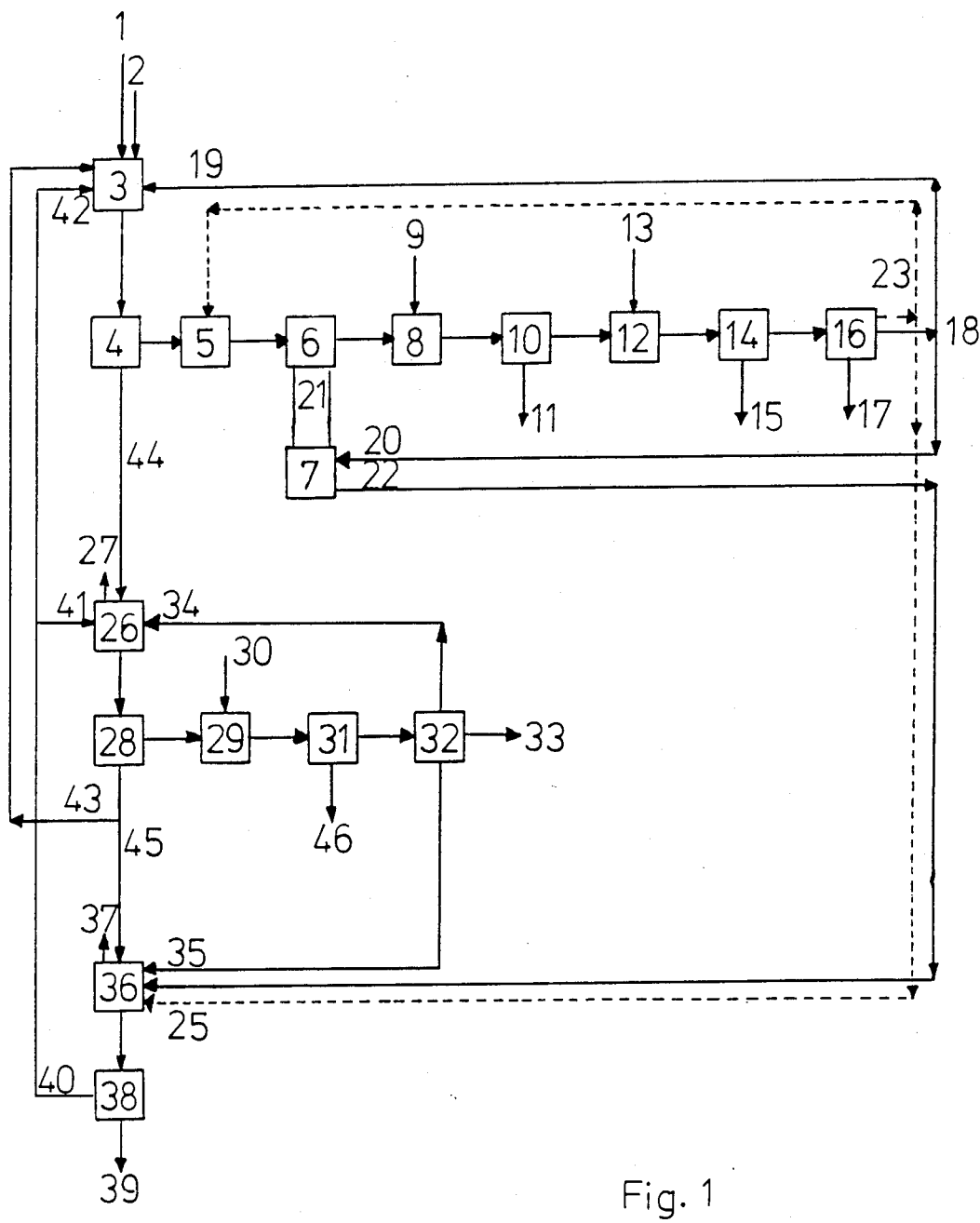
FIG. 1 is a flowsheet of the method of the invention.

On the simplified flowsheet in FIG. 1 (41) is the part-solution of cupric chloride/sulphate going to the copper leach stage (26), as the other part-solution (42) goes to the metathesis stage (3) where fresh metal sulphide containing material (1), leach residue (43) and water/thin filtrates (2) and returned anolyte (19) is also fed. After the reaction solid and solution are separated in (4). The residue (44) goes to the copper leach stage (26) while the solution goes to an oxidation stage (5) where chlorine gas (24) is used as an oxidant. After the oxidation the solution goes to an extraction system (6) where preferably about 90% of the total content of ferric chloride in the solution is removed by the use of an organic reagent (21). The organic reagent is stripped in (7) using anolyte (20), and a strip solution (22) is fed to the chlorine leach tank (36). The solution from the extraction goes to (8) where preferably lime is added (9) to make ferric hydroxide from the remaining ferric chloride in the solution. The hydroxide precipitate (11) is separated from the solution in (10) and the solution goes to a cementation (12) where metallic zinc (13) is added. The cemented copper (15) is separated from the solution in (14). The purified solution goes to the electrolysis stage (16) where zinc (17) is obtained. Chlorine gas (23) which is formed is separated into two part streams (24) and (25), where (24) is returned to the oxidation of the metathese filtrate in (5), as (25) goes to the chlorine leach stage (36). The anolyte (18) is also separated into two part-solutions (19) and (20), where (19) is returned to the metathesis stage (3) as the other (20) goes to the strip stage (7).

The residue (44) from the metathese stage goes to the copper leach stage (26) where also the part-solution of cupric chloride/sulphate (41) and the anolyte (34) is fed. The evaporation from this stage is (27). After ended reactions the residue and the solution are separated in (28). The residue is split into two part-residues (43) and (45) where part-residue (43) is recycled to the metathese stage as part-residue (45) goes to the chlorine leach stage (36). The solution goes to a purification stage (29) where metallic iron and sodium sulphide is added (30). The residue formed (46) is separated from the solution in (31) and the purified electrolyte goes to the copper electrolysis stage (32) where copper is produced (33). The anolyte from the copper electrolysis stage (34) is returned to the copper leach stage (26), as the catholyte (35) goes to the chlorine leach stage (36). The chlorine leach stage (36) receives residue (45) from the copper leach stage (26) and (28) together with catholyte (35), strip solution (22) and chlorine gas (25). The evaporation from this stage is (37). After completed reactions in the chlorine leach stage (36) the residue (39) and the solution (40) is separated in (38). The residue (39) is stored as the solution (40) is returned to the process by separating it into two part-solutions (41) and (42), and the process starts all over again.

Figure 2:
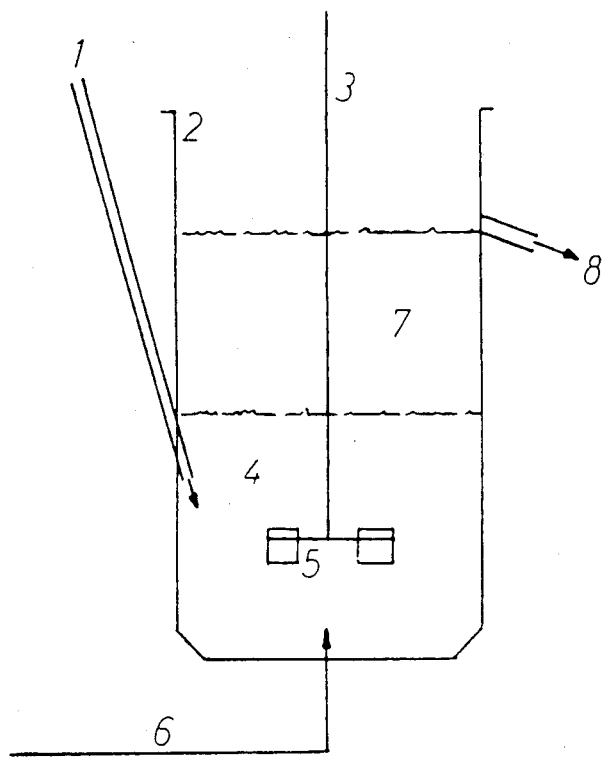
FIG. 2 is a schematic view of the leach tank for the copper leaching as used in the invention.

FIG. 2 shows a leach tank operation. The concentate from the metathese stage (1) (in FIG. 1 shown as No. 44) is added to the leach tank (2), here shown as an open tank. The stirring is effected using an impeller/propeller type mixer (3) and (5) which stirs the content in the tank in such a manner that two phases occur. The upper phase (7) contains to the largest extent the leach residue (in FIG. 1 named as No. 43) which contains 70-80% elementary sulphur. This residue together with the reduced solution is emptied in (8), as the residue (1) remains (sinks) in the lower phase (4) where it is leached by the fresh, cupric chloride/sulphate solution (6) (in FIG. 1 marked as No. 41), without reaching the outlet (8).

EXAMPLE 1

A chalcopyrite concentrate containing:

| Cu | Zn | Fe | S | Pb | Ag | |
|---|---|---|---|---|---|---|
| 28.1 | 1.0 | 32.9 | 33.0 | 0.12 | 0.10 | wt % | was added to a continuously operating stirred leach tank with a vigorous stirring together with a strong magnesium chloride solution. This solution simulated the recycled filtrate from an ordinary hydroxide precipitation. The chalcopyrite was 97%-325 mesh (Tylor) grain size and it was added by vibration feeder. A strong cupric chloride/sulphate solution was added to obtain the desired level of red/ox in the reaction tank. The pump used was controlled by a red/ox control unit which caused the volum of the strong solution to vary in accordance with the desired red/ox in the filtrate from the leach tank. The temperature was all the time 100°-102° C. All variables were constant, except the red/ox value which was varied from about 200 mV (SCE) and up towards 400 mV (SCE) to show at which red/ox value the metathesis ended and when the ordinary leaching started.

Table 1 below shows the results.

TABLE 1

| Results | |
|---|---|
| Feeding of chalcopyrite = | 10.0 kg/hr |
| Feeding of MgCl$_2$-solution = | 10.0 l/hr |
| Feeding of CuCl$_2$/SO$_4$-solution = | 0.3-25 l/hr |
| Volume leach tank (effective) = | 50 liters |
| Temperature = | 102° C. |
| Retention time = | 1.5-5 hours |
| | (average 3.5-4.5 hrs |

| | | Filtrate analysis: | | | | | |
|---|---|---|---|---|---|---|---|
| | Volume | | g/l | | mg/l | | g/l |
| Red/ox | Filtrate | | | | | | |
| (SCE) | l/hr | Cu | Fe | Zn | Pb | Ag | Cl | SO$_4$ |
| 250 | 10.3 | 1.5 | 0.3 | 1.4 | 580 | 95 | 263 | 128 |

TABLE 1-continued

| Red/ox (SCE) | | | | | | | | |
|---|---|---|---|---|---|---|---|---|
| 290 | 11.1 | 6.0 | 1.4 | 3.2 | 970 | 145 | 263 | 128 |
| 310 | 12.5 | 10 | 2.6 | 7.2 | 940 | 270 | 263 | 128 |
| 330 | 13.4 | 17 | 3.7 | 7.3 | 880 | 560 | 263 | 128 |
| 350 | 15.9 | 32 | 6.2 | 6.2 | 740 | 590 | 264 | 129 |
| 380 | 34.9 | 82 | 11 | 2.8 | 340 | 280 | 264 | 129 |

Residue analysis:

| Red/ox (SCE) | Weight g/hr | Cu | Fe | Zn | Pb | Ag | S | S° |
|---|---|---|---|---|---|---|---|---|
| 250 | 9980 | 28.2 | 32.9 | 0.86 | 0.06 | 0.09 | 33 | <0.1 |
| 290 | 9950 | 28.4 | 32.9 | 0.65 | 0.01 | 0.08 | 33 | <0.1 |
| 310 | 9920 | 29.0 | 32.8 | 0.10 | <0.01 | 0.07 | 33 | <0.1 |
| 330 | 9880 | 28.9 | 32.8 | 0.02 | — | 0.03 | 33 | 0.1 |
| 350 | 9740 | 28.5 | 32.7 | 0.02 | — | <0.01 | 34 | 0.8 |
| 380 | 8610 | 22.5 | 33.6 | 0.02 | — | — | 38 | 7.7 |

Starting solution analysis:

| | Cu++ | Mg | Cl | SO4-- |
|---|---|---|---|---|
| | g/l | | | |
| CuCl2/SO4-solution | 80 | 90 | 263 | 128 |
| MgCl2-solution | 0 | 120 | 265 | 129 |

Conclusions:

The test shows that at chloride concentrations of 263 g/l and at a red/ox of 310 mV (SCE) the metathesis ends, producing a secondary precipiate of CuS, ordinary leaching starts. This is indicated by the excess of elementary sulphur (S°) in the residue. At the same time the percentage Cu in the residue is at a maximum at 310 mV.

The main reaction happening in the metathesis is:

$$Cu^{++} + ZnS \rightleftharpoons Zn^{++} + CuS$$

and in the leaching:

$$Cu^{++} + CuS \rightleftharpoons 2\ Cu^+ + S°.$$

EXAMPLE 2

This test was done in a strong chloride solution having 352 g/l chlorides, to demonstrate the fact that at such high chloride concentrations no metathesis is done forming secondary precipitation of copper in accordance with the formula:

$$2\ Cu^+ + S° \rightleftharpoons CuS + Cu^{++}$$

The test method was the same as the one mentioned in test No. 1.

The concentrate used was the one which was made in test No. 1 at 310 mV.

| Feeding of concentrate = | 3000 g/hr |
|---|---|
| Feeding of strong MgCl2-solution = | 10 l/hr |
| Feeding of strong CuCl2/SO4-solution = | 0.6–36 l/hr |
| Volume reaction tank (effective) = | 50 liter |
| Temperature = | 102° C. |
| Retention time = | 1.5–5 hrs |

Filtrate analysis:

| Red/ox (SCE) | Volume filtrate l/hr | Cu | Fe | Cl− | SO4-- |
|---|---|---|---|---|---|
| | | g/l | | | |
| 250 | 11.7 | 15 | 3.3 | 351 | 128 |
| 290 | 22.2 | 58 | 13 | 352 | 128 |
| 310 | 35.0 | 76 | 17 | 352 | 129 |
| 330 | 44.5 | 81 | 19 | 352 | 129 |
| 350 | 46.0 | 81 | 19 | 352 | 129 |

Residue analysis:

| Red/ox (SCE) | Weight g/hr | Cu | Fe | S | S° |
|---|---|---|---|---|---|
| | | wt % | | | |
| 250 | 2920 | 28.4 | 32.4 | 34 | 1.2 |
| 290 | 2400 | 23.3 | 28.7 | 42 | 13 |
| 310 | 1760 | 12.5 | 22.4 | 57 | 37 |
| 330 | 1310 | 1.6 | 11.3 | 76 | 68 |
| 350 | 1250 | 1.0 | 7.8 | 79 | 74 |

Start solution analysis:

| | Cu++ | Mg | Cl− | SO4-- |
|---|---|---|---|---|
| | g/l | | | |
| CuCl2/SO4-solution | 80 | 120 | 352 | 128 |
| MgCl2-solution | 0 | 150 | 351 | 129 |

Conclusions:

The test shows that the leaching was completed at about 330 mV and that no precipitation of CuS was occurring at chloride concentrations of 352 g/l, indicated by the fact that elementary sulphur (S°) was in excess all the time.

EXAMPLE 3

When test No. 1 and No. 2 had shown that the chloride concentration was important for the metathese reactions and the leach reactions and that the red/ox should be about 300–330 mV (SCE) for both operations, this test was designed to find the limits for the metathesis and the leaching reactions with respect to the chloride concentrations. This test was done as done in test 2 above using the residue from test No. 1 (310 mV).

Elementary sulphur was added to 5%.

| Feeding of concentrate = | 1200 g/hr |
|---|---|
| Volume filtrate = | 18.0 l/hr |
| Temperature = | 100° C. |
| Retention time = | 3 hrs |
| Red/ox = | 330 mV (SCE) |

Filtrate analysis:

| Chlorides g/l | Net gain of Cu in the filtrate (g/l) | | | |
|---|---|---|---|---|
| | Cu | Cu++ | Cu+ | % Cu leached |
| 204 | 6 | 6 | 0 | 7 |
| 248 | 8 | 8 | 0 | 9 |
| 285 | 30 | 15 | 15 | 34 |
| 322 | 61 | 15 | 46 | 70 |
| 346 | 81 | 12 | 69 | 93 |
| 370 | 82 | 10 | 72 | 94 |

Conclusions:

Test 3 shows that almost no leaching of copper occurs at chloride concentrations less than 248 g/l in the process solution (i.e. full metathesis) as almost all the copper is leached at chloride concentrations higher than 346 g/l. Between these limits (at 310 mV), there is a more shaded zone where metathesis does happen, but to a limited extent.

EXAMPLE 4

This test was performed on such a leach operation as mentioned in test 3 above, except in this test a special reactor was used and the stirring varied with respect to the separation of the "phases" of chalcopyrite and leach residue containing 70–80% elementary sulphur, thus avoiding the "shortening". This was not considered in the previous tests. The added energy to the solution (the slurry) in the leach tank was measured directly on the current which the stirring motor was using, and calculated from this.

| Feeding of concentrate = | 1200 g/hr |
|---|---|

| -continued | |
| --- | --- |
| Chloride concentration = | 350 g/l |
| Filtrate volume = | 18 l/hr |

Filtrate analysis:

| Red/ox | Added energy | g/l | | |
| --- | --- | --- | --- | --- |
| (SCE) | Hk/m³ soln. | Cu | Cu⁺⁺ | Fe⁺⁺ |
| 308 | 0.1 | 84 | 4 | 20 |
| 310 | 0.2 | 83 | 4 | 20 |
| 313 | 0.4 | 84 | 5 | 20 |
| 320 | 0.6 | 83 | 10 | 20 |
| 326 | 0.8 | 83 | 16 | 19 |
| 330 | 1.0 | 82 | 23 | 19 |

Residue analysis:

| Added energy | wt % | | | |
| --- | --- | --- | --- | --- |
| Hk/m³ solution | Cu | Fe | S | S° |
| 0.1 | 1.0 | 7.2 | 80 | 75 |
| 0.2 | 1.0 | 7.9 | 79 | 74 |
| 0.4 | 1.2 | 9.4 | 78 | 72 |
| 0.6 | 2.6 | 11.1 | 75 | 67 |
| 0.8 | 3.1 | 14.3 | 72 | 62 |
| 1.0 | 5.8 | 16.8 | 67 | 55 |

Conclusions:

The test shows that the reactor used here had a shortening energy of larger than 0.4 Hk/m³ solution. This shortening energy will, of course, vary from design to design, but the principle will be the same and be within the intentions of this invention. Further a well reduced solution and a good leaching was obtained.

EXAMPLE 5

A complex zinc/copper/lead concentrate being >97%-325 mesh grain size was leached in three batch tests in accordance with this invention. The three different leach stages—the metathesis stage, the copper leach stage and the oxidation leach stage was simulated by using a weaker cupric chloride/sulphate solution having 265 g/l chlorides for the metathesis and a stronger cupric chloride/sulphate solution having 350 g/l chlorides for the two other leaches. The chloride concentration was varied using different additions of magnesium chloride. The leaches was done at 102°-110° C. in 4 hours in a 10 liter stirred vessel for the metathesis and in a 30 liter stirred vessel for the two other leaches.

After ended reactions, the slurry was filtered and solution and residue analysed.

In the metathesis (leach No. 1) the fresh material was added to the weaker $CuCl_2/SO_4$-solution. After ended reactions the slurry was filtered and residue and solution was analysed.

In the copper leach (leach No. 2) the residue from the metathesis was added to the stronger $CuCl_2/SO_4$-solution. After ended reaction the slurry was filtered and the residue and the solution was analysed.

In the oxidation leaching (leach No. 3) the residue from the copper leach was chlorine gas leached in the stronger $CuCl_2/SO_4$-solution. After ended reaction, the slurry was filtered and the residue and the solution were analysed.

Results

1. Solutions

| Filtrate | Vol | Cu⁺⁺ | Cu⁺ | Fe³⁺ | Fe²⁺ | Zn | Pb | Mg | Cl⁻ | HCl | SO₄⁻⁻ |
| --- | --- | --- | --- | --- | --- | --- | --- | --- | --- | --- | --- |
| No. 1 | 4.5 | 0 | 0.1 | 0 | 22 | 47 | 3.1 | 90 | 265 | 5 | 122 |
| No. 2 | 15 | 4 | 74 | 0 | 3,5 | 1.4 | 0.8 | 130 | 350 | 4 | 122 |
| No. 3 | 20 | 55 | 0 | 2.1 | 0 | <0.1 | <0.1 | 130 | 360 | 3 | 122 |
| Start soln. 1 | | | 80 | 0 | 0 | 0 | 0 | 90 | 265 | 0 | 120 |
| Start soln. 2,3 | | | 50 | 0 | 0 | 0 | 0 | 130 | 350 | 0 | 120 |

2. Residues

| | % | | | | | |
| --- | --- | --- | --- | --- | --- | --- |
| | Cu | Fe | Zn | Pb | S | Weight (g) |
| Concentrate | 15.3 | 24.0 | 23.3 | 2.8 | 33.3 | 1000 |
| Residue No. 1 | 49 | 14 | 2.2 | 1.4 | 32 | 1030 |
| Residue No. 2 | 19 | 14 | 0.4 | 0.5 | 63 | 510 |
| Residue No. 3 | 0.6 | 7.5 | <0.1 | <0.1 | 85 | 380 |

Conclusions:

This example clearly shows the necessity of the third chlorine gas leach stage incorporated into the process in order to obtain a good leaching of the valuable metals when strongly complex (impure) concentrates are treated. At the same time the solutions were of satisfactory character for further treatment by the process.

EXAMPLE 6

This test was done on the same concentrate as the one used in example 5, except that in this test the metathesis (leach No. 1) was done in an autoclave at 140°-142° C. After 2 hours reaction time, the slurry was cooled, filtered and the residue analysed.

Results.
Residue analysis.

| Elements | Start conc. | Residue |
| --- | --- | --- |
| Cu | 15.3% | 58% |
| Fe | 24.0% | 2.4% |
| Zn | 23.3% | 1.6% |
| Pb | 2.8% | 0.5% |
| S | 33.3% | 32% |
| Ni | 1200 ppm | 60 ppm |
| Co | 300 ppm | 90 ppm |
| Ag | 520 ppm | 300 ppm |
| As | 120 ppm | 6 ppm |
| Mo | 12 ppm | 2 ppm |
| Te | 10 | 10 |
| Se | 15 | 15 |
| Bi | 22 | 2 |
| Weight (g) | 1000 | 1020 |

This example shows that a higher reaction temperature makes a cleaner metathesis residue in a shorter time when compared to example 5. This is especially shown w.r.t. iron in the residue. At the same time the trace elements are well leached except selenium and tellurium. The silver is partly leached.

Conclusions:

An increase in the reaction temperature in the metathesis stage from 105°-110° C. to 140°-142° C. increases the reaction rate and a cleaner metathesis residue is produced in a shorter time. The principle, however, concerning this invention is not changed by increasing the reaction temperature.

We claim:

1. A method for leaching copper and at least one other metal selected from the group consisting of zinc, lead, silver, nickel, cobalt and mixtures thereof from a metal sulphide material which comprises the steps of preparing a cupric chloride/cupric sulphate solution, separating the solution into two parts and maintaining a volume ratio of a first of said parts in the range of 1:1 to 1:100 with respect to a second of said parts, contacting a metal sulphide material containing copper and at least one of said other metals with said first part in a metathesis zone while maintaining the chlorine content in said first part at a value less than 300 g/l to leach said metals from said material while preventing leaching of said copper to thereby provide a leachate containing said metals and a residue containing copper sulphide, contacting said residue with said second part of the solution in a copper leaching zone while maintaining the chlorine content in said second part at a value above 300 g/l to substantially leach said copper from said residue and provide a second leachate containing copper, and separating the copper from said second leachate.

2. The method of claim 1, and wherein said chlorine content is maintained at a value of 200 to 300 g/l in said metathesis zone.

3. The method of claim 1, and including the step of maintaining the chlorine content at a value in the range of 300 to 400 g/l in the copper leaching zone.

4. The method of claim 1, wherein said copper is separated from said second leachate by electrolysis.

5. The method of claim 1, wherein the reduction/oxidation in the metathesis zone is between 100 and 400 mV (SCE).

6. The method of claim 1, in which the reduction/oxidation in the copper leaching zone is between 200 and 400 mV (SCE).

7. The method of claim 4, and including the steps of dividing the second leachate after removal of copper into two portions with a first of said portions being recycled to the copper leaching zone and a second of said portions being introduced into contact with the residue from said copper leaching zone, and maintaining the volume ratio between said first and second portions in the range of 10:1 and 1:10.

8. The method of claim 1, wherein the sulphate content of the cupric chloride/cupric sulphate solution is between 50 and 200 g/l.

9. The method of claim 1, wherein said chloride concentration is adjusted to keep cuprous chloride in solution by the addition of magnesium chloride.

10. The method of claim 1, wherein the temperature in the metathesis zone is maintained between 90° and 150° C.

11. The method of claim 1, and including the step of maintaining a stoichiometric excess of sulphur with respect to copper in said metathesis zone to ensure precipitation of copper as copper sulphide.

12. The method of claim 11, and including the step of recycling residue from the copper leaching zone to said metathesis zone to maintain said excess of said sulphur.

* * * * *